(12) United States Patent
Edwards

(10) Patent No.: US 8,051,875 B2
(45) Date of Patent: Nov. 8, 2011

(54) PIPELINE PROTECTION SYSTEM

(75) Inventor: Jeremy Paul Lawrence Edwards, Newburgh (GB)

(73) Assignee: Vetco Gray Controls Limited, Nailsea, Bristol (GB)

( * ) Notice: Subject to any disclaimer, the term of this patent is extended or adjusted under 35 U.S.C. 154(b) by 855 days.

(21) Appl. No.: 11/804,862

(22) Filed: May 21, 2007

(65) Prior Publication Data

US 2008/0000529 A1   Jan. 3, 2008

(30) Foreign Application Priority Data

May 20, 2006  (GB) ................................. 0610069.7

(51) Int. Cl.
*F16K 17/00* (2006.01)
(52) U.S. Cl. .............. 137/461; 137/599.04; 137/599.07; 137/601.14; 137/870; 137/883
(58) Field of Classification Search ............. 137/599.01, 137/599.05, 599.06, 599.07, 601.14, 870, 137/883, 461, 599.04
See application file for complete search history.

(56) References Cited

U.S. PATENT DOCUMENTS

| 4,521,221 A * | 6/1985 | Richter et al. ............... 48/127.3 |
| 2004/0261856 A1* | 12/2004 | Klaver et al. ............... 137/487.5 |
| 2005/0199286 A1* | 9/2005 | Appleford et al. ......... 137/487.5 |

FOREIGN PATENT DOCUMENTS

| GB | 2401164 A | 11/2004 |
| WO | WO 03/106888 A1 | 12/2003 |

* cited by examiner

*Primary Examiner* — Stephen M Hepperle
*Assistant Examiner* — William McCalister
(74) *Attorney, Agent, or Firm* — Bracewell & Giuliani LLP

(57) ABSTRACT

A protection apparatus detects and reduces overpressure in a fluid pipeline. First and second pipeline valves are connected in series along the pipeline and are independently switchable between open and closed positions. A pressure transducer determines the fluid pressure in the pipeline at a point intermediate the first and second pipeline valves. A bypass line has a first end connected to the pipeline between the input end and the first pipeline valve and a second end connected to the pipeline between the first and second pipeline valves. A bypass valve is connected along the bypass line. A vent line is connected to the bypass line between the bypass valve and the second end of the bypass line. A vent valve is connected along the vent line.

10 Claims, 9 Drawing Sheets

Fig 1 - Prior Art

PIPELINE PROTECTION SYSTEM

CROSS-REFERENCE TO RELATED APPLICATION

This application claims the benefit of United Kingdom Patent Application No. 0610069.7, filed on May 20, 2006, which hereby is incorporated by reference in its entirety.

FIELD OF THE INVENTION

This invention relates to a protection apparatus for detecting and reducing overpressure in a fluid pipeline and a method for resetting a pipeline protection system after tripping.

BACKGROUND OF THE INVENTION

Hydrocarbon wells, for example subsea oil wells, require a pipeline through which the hydrocarbon fluid is transported. In the case of subsea wells, these may be of substantial length, sometimes several tens of kilometres long. Consequently, the pipeline is a major cost element of the fluid extraction system. Many subsea wells have to contend with very high fluid pressures, for example as high as 700 bar. For a pipeline to withstand such pressure would require it to have a substantial wall thickness, and it is not cost effective to implement this for long pipelines. To decrease cost, it is preferable instead to reduce the maximum operating pressure of the pipeline, typically to about 200 bar, using devices such as valves or chokes to reduce the fluid pressure from the well. However, a failure of the pressure reducing device may result in overpressure in the pipeline with disastrous results. To prevent this happening, a pipeline protection system is typically incorporated into the pipeline proximate the well. Such a system must have high integrity and virtually guarantee to prevent any overpressure from the well from reaching the pipeline.

FIG. 1 shows a typical conventional high integrity pipeline protection system (HIPPS). Two hydraulically operated 'HIPPS' barrier valves 1 and 2 are inserted in the fluid extraction flow line 3, prior to the thinner walled pipeline 4. These valves are opened when their operating hydraulic cylinders are fed with hydraulic pressure, and closed, typically under spring pressure, when the hydraulic pressure is removed and vented, i.e. they are failsafe. Pressure transducers 5, 6 and 7 are fitted between the valves 1 and 2. The pressure transducers 5, 6 and 7 are connected to a subsea control module (SCM) 8, which houses a hard-wired and thus also high integrity, electronic safety critical control board. This board produces an output that energises directional control valves (DCVs) which in turn operate the valves 1 and 2. The DCVs are also failsafe in that they close the hydraulic pressure source, and open the valve 1 and 2 actuating cylinders to vent when de-energised. Thus loss of electrical or hydraulic power causes the valves 1 and 2 to close. The safety critical control board in the SEM 8 contains logic that de-energises the DCVs if two out of the three transducers 5, 6 and 7 indicate a pressure level that exceeds a pre-set limit. This limit is set to a pressure that is less than the safe operating pressure of the pipeline 4. The use of two failsafe HIPPS valves, three pressure transducers and failsafe DCVs ensures high integrity of the system.

Employment of a HIPPS system not only reduces installation costs, but also allows for reduced rating of downstream equipment, such as risers, separators and process plant and permits high pressure fields to be commercially viable by allowing them to tie into existing infrastructures.

Although such known HIPPS systems are effective at protecting the pipeline, they are relatively basic, and do not address the problem of reducing the overpressure in the fluid system, which should be reduced before the HIPPS valves are re-opened and normal operation resumed. It is of course preferable that the overpressure is reduced in a controlled manner which minimizes the risk of component damage.

SUMMARY OF THE INVENTION

It is an aim of the present invention to provide a HIPPS system which enables a controlled start-up and shutdown which improves the integrity of the system.

According to a first aspect of the present invention there is provided a protection apparatus for detecting and reducing overpressure in a fluid pipeline having a fluid input end and a fluid output end, the fluid input end being connected in use to a fluid source, as set out in the accompanying claims.

According to a second aspect of the invention there is provided a method for resetting a pipeline protection system after tripping, as set out in the accompanying claims.

BRIEF DESCRIPTION OF THE DRAWINGS

The invention will now be described with reference to the accompanying figures, in which.

DETAILED DESCRIPTION OF THE INVENTION

Figure 1:
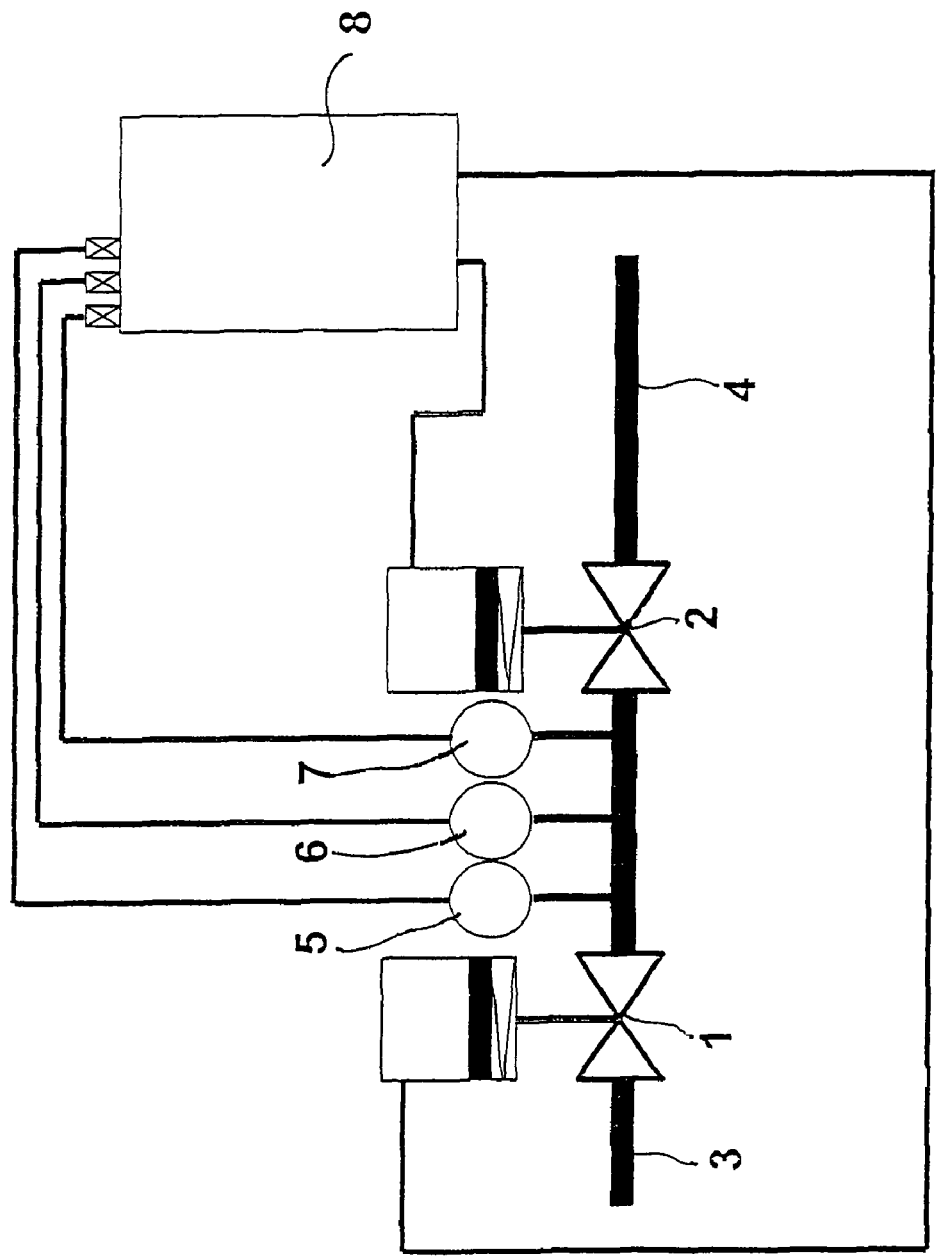
FIG. 1 shows a known HIPPS system.
Figure 2:
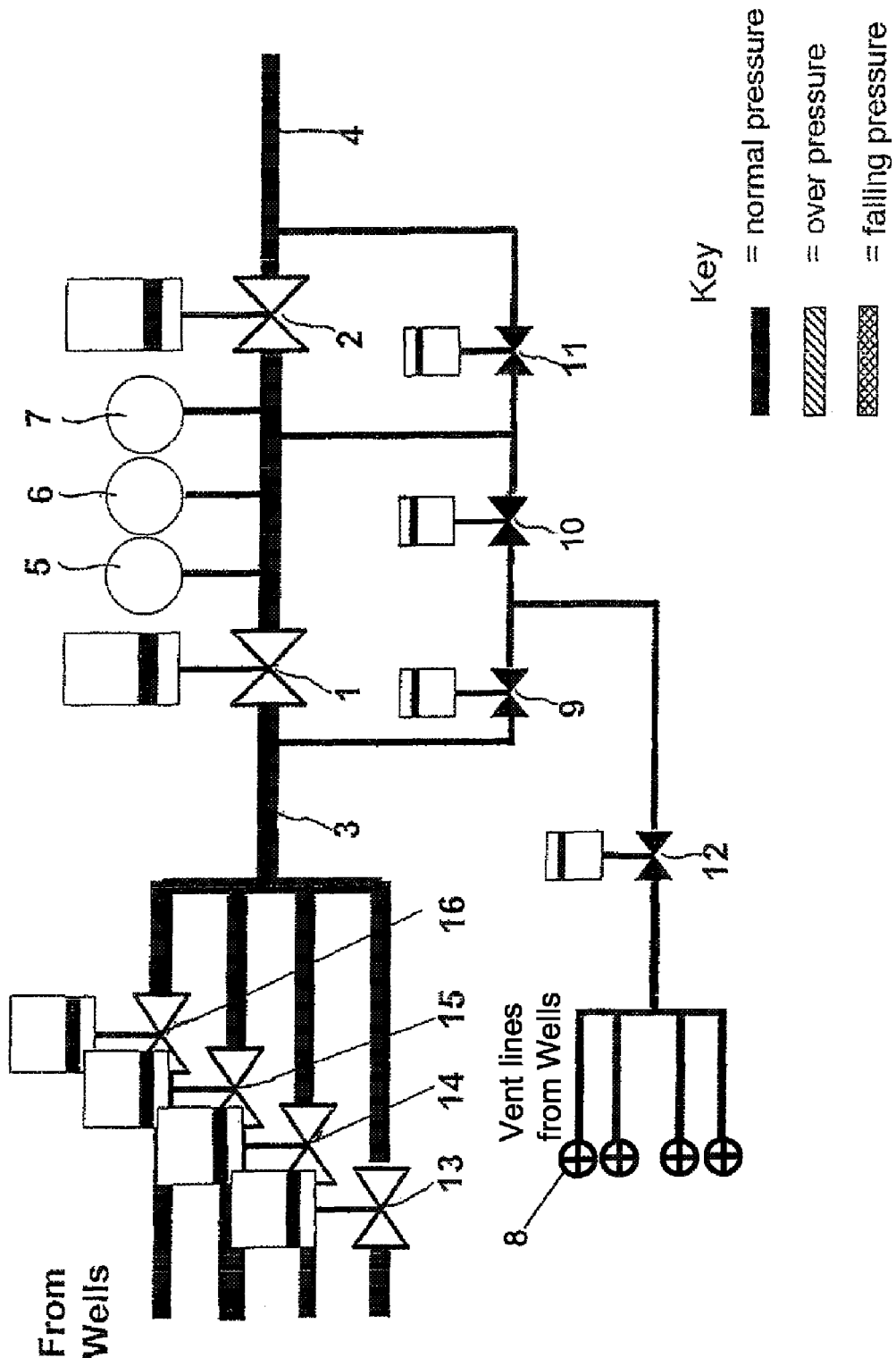
FIG. 2 schematically shows apparatus in accordance with the present invention during normal operation.

FIG. 2 shows an embodiment of the present invention in which the system is in normal, i.e. fault-free, operation. As shown, fluid enters the system from four wells connected via individual isolation valves 13, 14, 15, and 16 to a relatively thick-walled high pressure fluid extraction input flowline 3. This in turn connects to a relatively thin-walled lower pressure output pipeline 4. The fluid flow from flowline 3 to pipeline 4 is regulated by series-connected pipeline HIPPS barrier valves 1 and 2. Connected between pipeline HIPPS valves 1 and 2 are three pressure transducers 5, 6 and 7. A fluid bypass line is connected between flowline 3 and a location between valves 1 and 2, the bypass line including a by-pass valve 9. A further bypass branch is connected between the bypass line and pipeline 4, which includes a bypass valve 11. The bore of the bypass line and branch pipework is relatively small, typically having a diameter of about 2 inches (5.08 cm). This compares to a typical flowline 3 diameter of about 9 inches (22.86 cm) and pipeline 4 diameter of about 11 inches (27.94 cm). The bypass line is further connected to a venting means 8 via a vent line. This is connected between bypass valve 9 and the bypass branch and leads to a venting system. The vent line includes a vent valve 12. An optional second bypass valve 10 may be connected between the vent line and the pressure transducers 5, 6 and 7. All of the valves are individually switchable to allow or block fluid flow therethrough. Switching is actuated by means of individual respective hydraulic actuators which are fed with hydraulic power via additional DCVs in an SCM (not shown) which are controlled by additional hard wired electronics on a safety critical control board. The valves 1 and 2 and the pressure transducers 5, 6 and 7 are similar to those described with respect to FIG. 1.

As shown in FIG. 2, the system is in normal, fault-free operation, in which all fluid pressures are below the threshold limits for the pipeline 4. valves 1, 2 and 13-16 are all open, so that fluid can flow from all the wells through to pipeline 4. The remaining valves 9, 10, 11 and 12 are all closed, so that no fluid is diverted through the bypass line.

The mode of operation of the system to provide a controlled system start up following a HIPPS trip caused by fluid overpressure is now described with reference to FIGS. 3 to 9.

Figure 3:
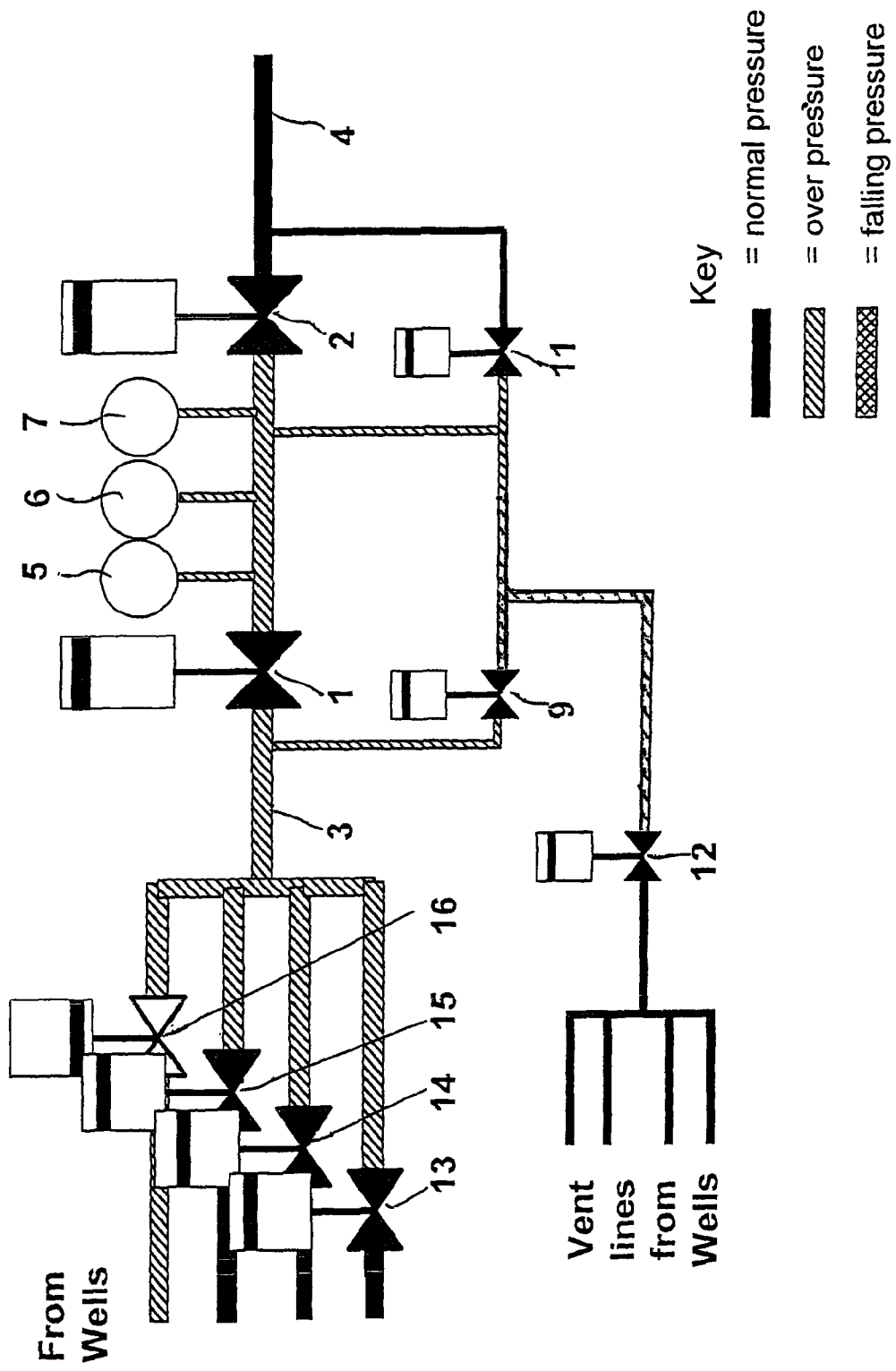
FIGS. 3 to 9 schematically show the apparatus of FIG. 2 during a shutdown/start-up operational sequence.

FIG. 3 shows the system following a "HIPPS trip". Here, overpressure from the topmost well as shown in the Figure has been detected by transducers 5, 6, 7, which cause HIPPS pipeline barrier valves 1 and 2 to trip, i.e. to close to prevent overpressure fluid from reaching pipeline 4. The cause of the overpressure, i.e. the topmost well, is determined by a pressure sensing device on the well-side of valve 16 (not shown). The fault-free well valves 13, 14 and 15 are also caused to close, to prevent backflow of fluid to their respective wells.

Following such a trip, which could for example have been caused by the failure of a production flow control choke at the topmost well, the pressure at that well output is reduced. This may be achieved by, for example, closing a valve (not shown) in the flowline at the well tree.

Figure 4:
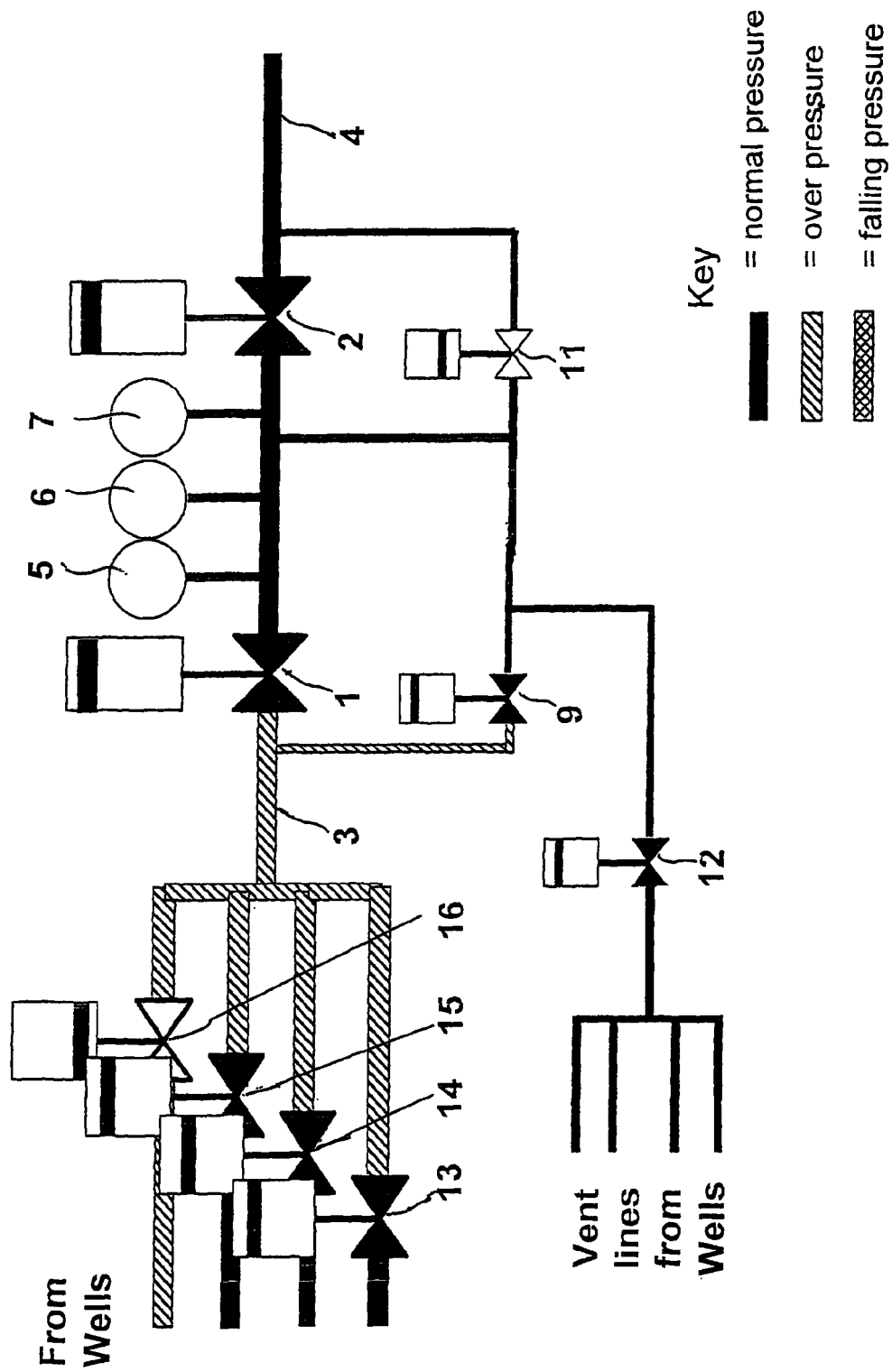

FIG. 4 shows the first step in resetting the system. Valve 11 is opened so that the overpressure between valves 1 and 2 is able to fall to normal, by bleeding the overpressure fluid through the bypass line and bypass branch to the pipeline 4. The pipe between valve 11 and pipeline 4 has a relatively small bore. Thus the rate of fluid flow, via valve 11, is constrained by the smaller bore pipe and the temporary increase in pressure from the bleeding of the residual overpressure in the pipe between valves 1 and 2 is gradual, and due to the relatively huge length of the pipeline 4 will result in a negligible increase in pressure of the pipeline 4. Although it may appear from the figure that the overpressure between valves 1 and 2 could instead simply be relieved by opening valve 2, this would result in unacceptable overpressure in pipeline 4.

Figure 5:
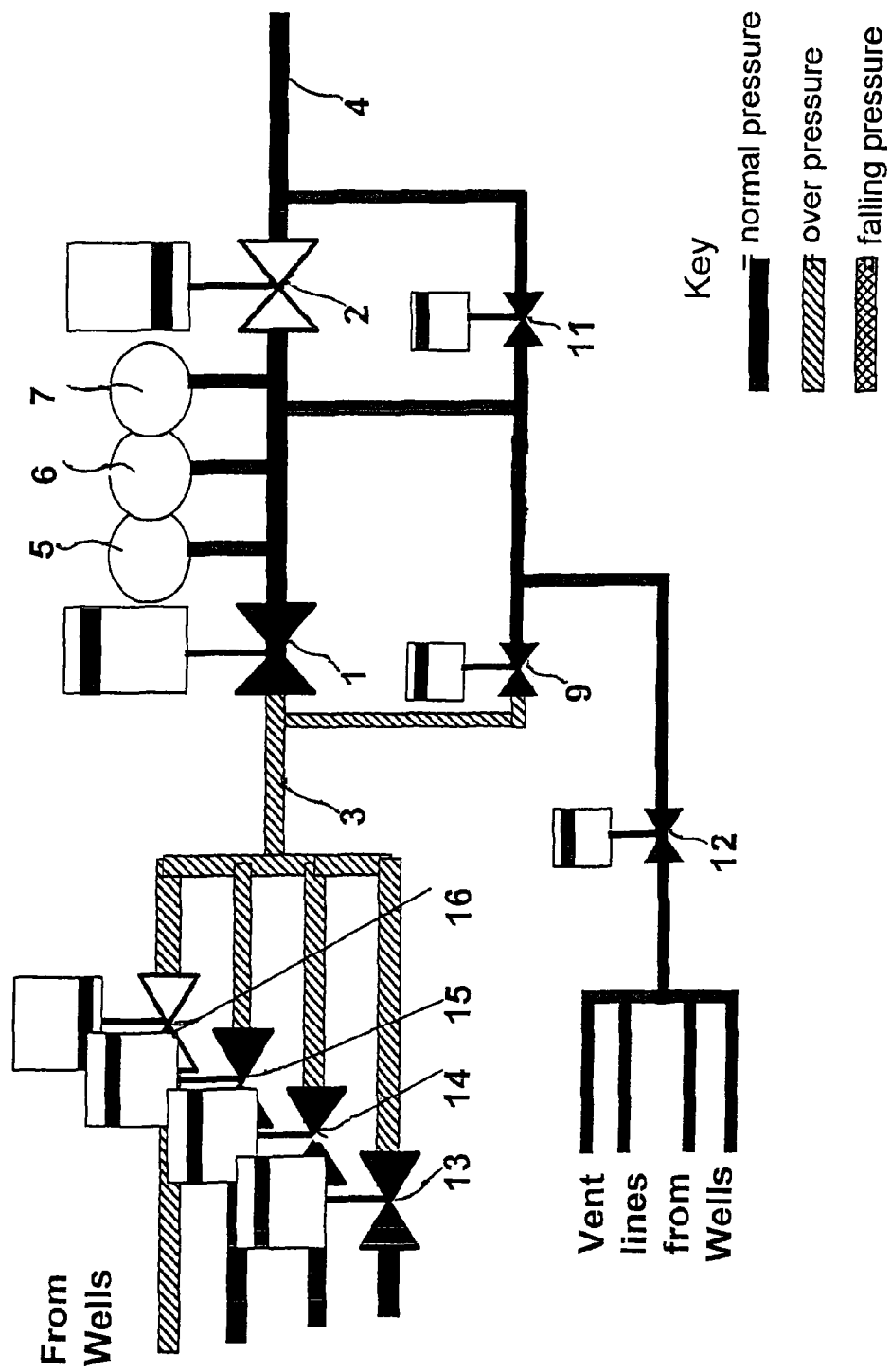

FIG. 5 shows the second reset step. Here, valve 11 is closed and valve 2 is opened. This step enables the pressure transducers 5, 6, 7 to sense the pressure in pipeline 4.

Figure 6:
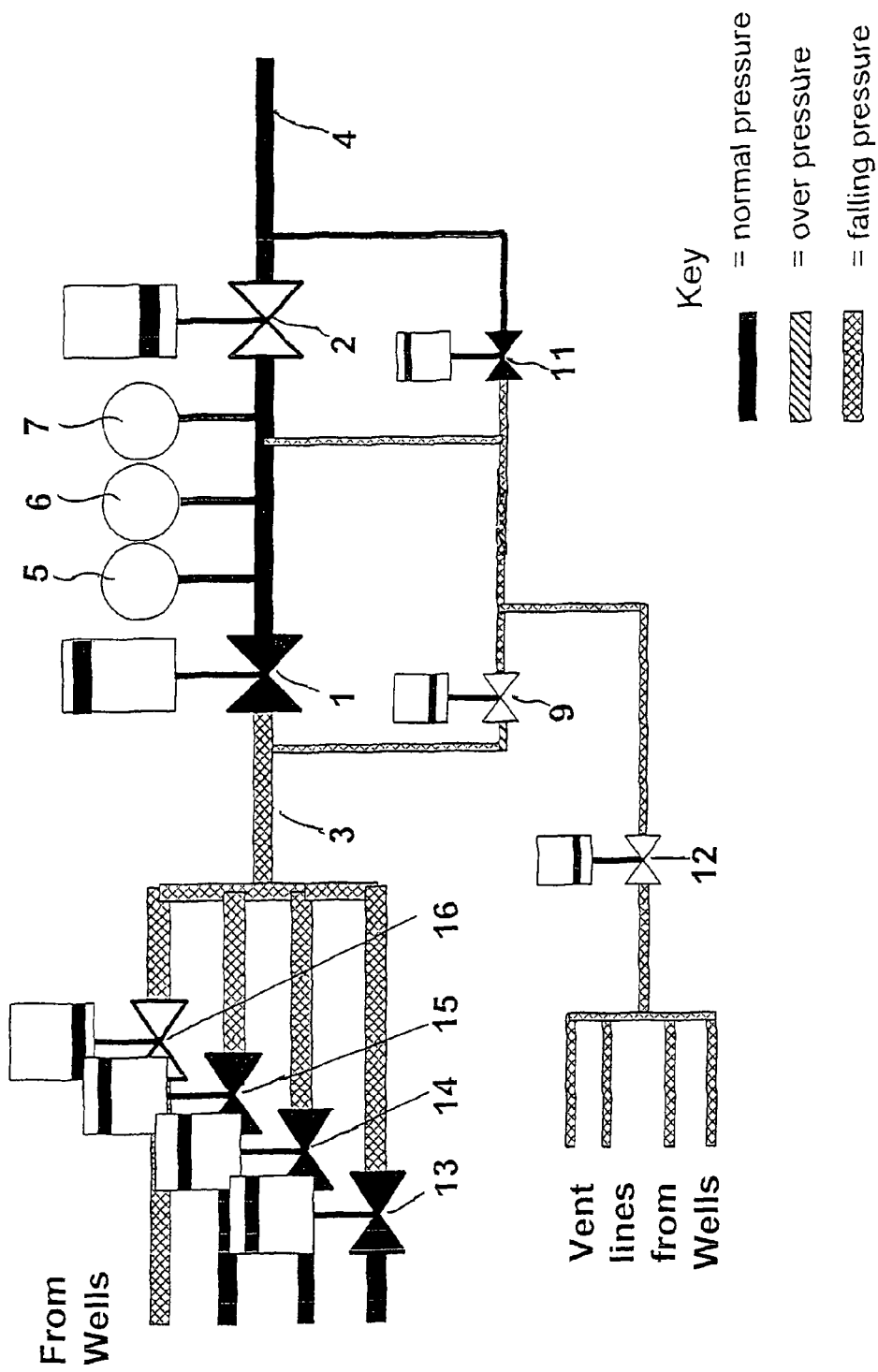

FIG. 6 shows the third reset step. Here, valves 9 and 12 are opened so that the region of overpressure between valve 1 and the well valves is connected to the vent. This allows the overpressure to fall.

Figure 7:
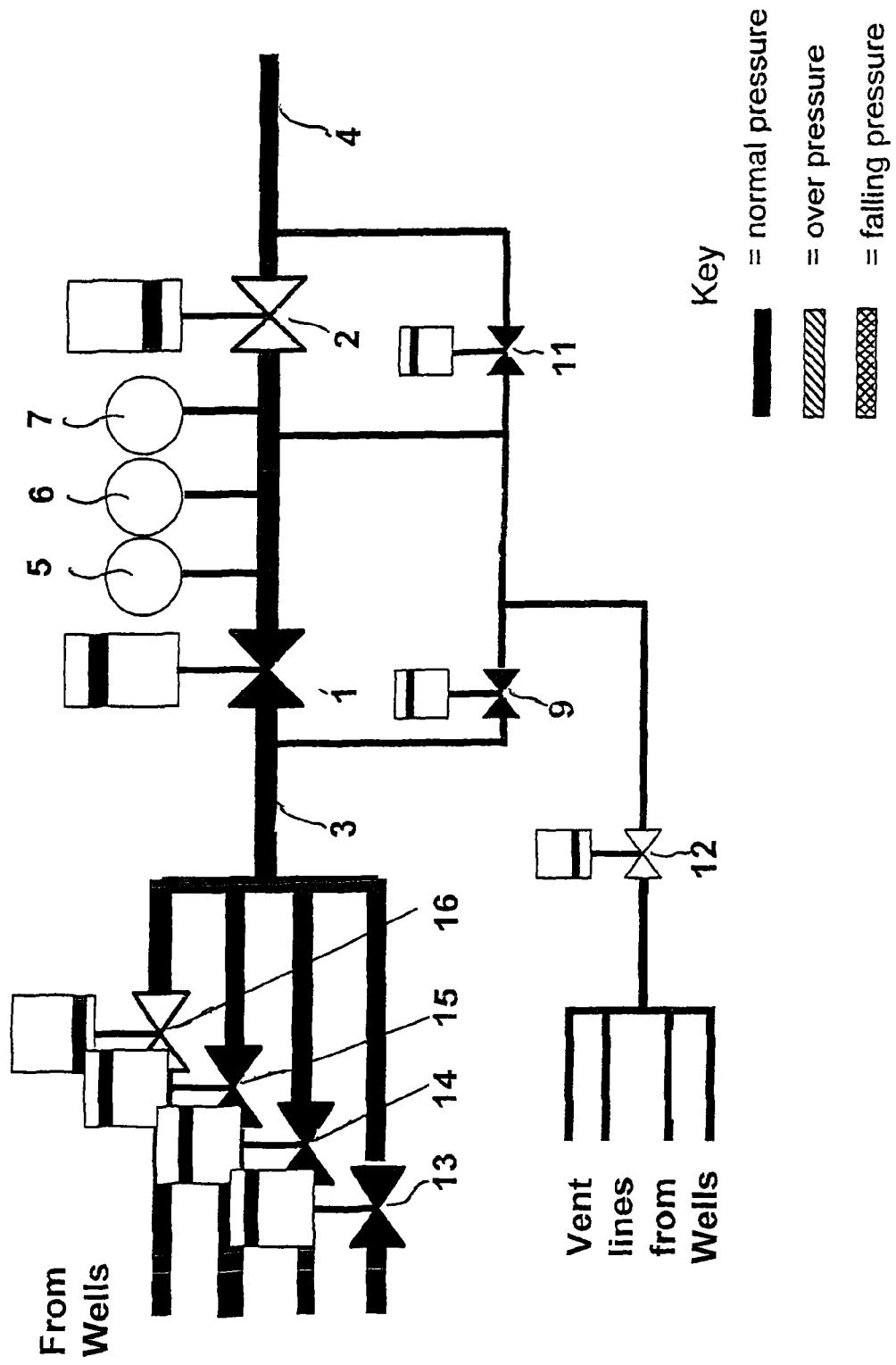

FIG. 7 shows the fourth reset step. Here, valve 9 is closed when the pressure transducers 5, 6 and 7 sense normal pressure, i.e. within operating limits. This closes the well to vent.

Figure 8:
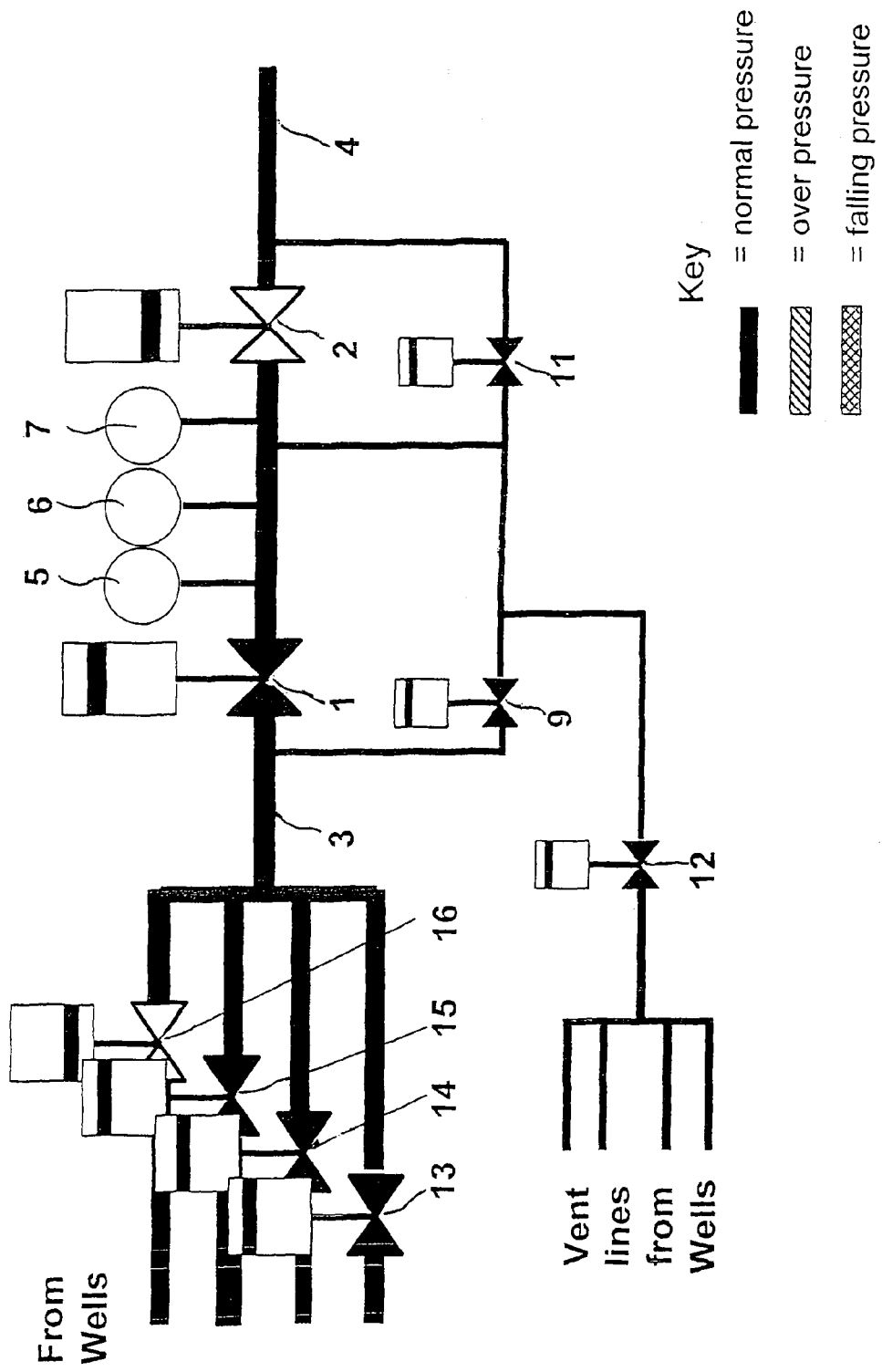

FIG. 8 shows the fifth reset step. Valve 12 is closed to close pressure transducers 5, 6 and 7 to vent.

Figure 9:
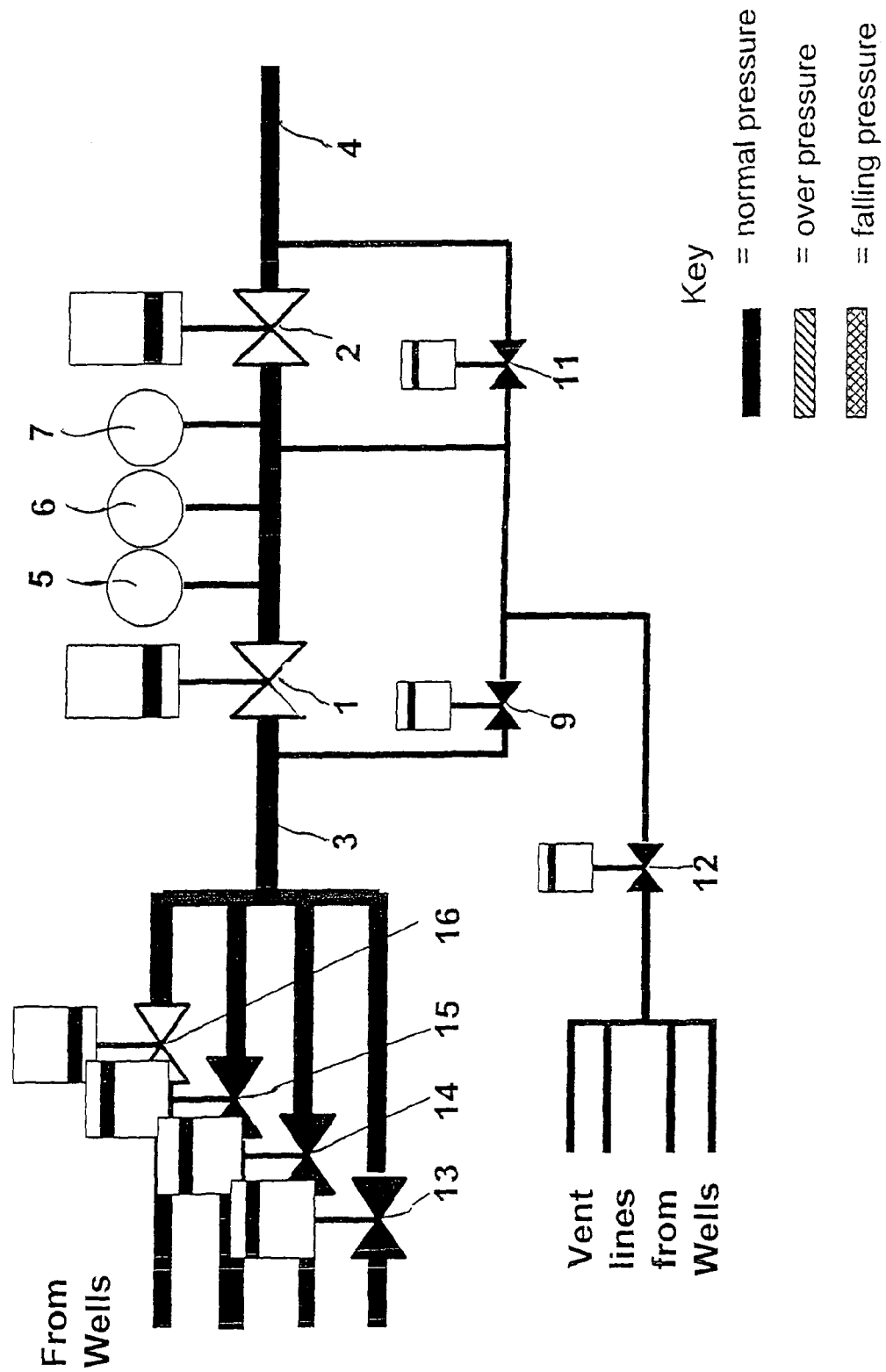

FIG. 9 shows the sixth reset step. Valve 1 is opened, which allows the pressure transducers 5, 6 and 7 to sense the pressure in the inlet flowline 3.

The final reset step is to open valves 13, 14 and 15, which restores the system to normal operation, as shown in FIG. 2.

Ideally, the closed HIPPS barrier valve 1 should not be bypassed when high pressure is potentially available to the low pressure pipeline 4. In FIG. 6, showing the third reset step, valve 9 is shown open, which appears to contravene this rule. In practice however, this valve being open is not a problem, since the bore of the bypass pipework around the valves 9, 11 and 12 is typically much smaller than that of the production pipeline 4, and pipeline 4 is typically many kilometres long, so that raising the pressure to unsafe limits in the pipeline 4 would take a substantial period of time. An alternative system configuration could be used to allow for pressure bleeding of an overpressure well via the well tree and the vent lines, which would then permit valve 9 to be closed for the duration of the bleeding. In such an arrangement, the bypass branch and valve 11 may be omitted.

The figures and above description describe an embodiment of the invention only, and it will be apparent to those skilled in the art that various alternatives are possible within the scope of the invention.

For example, it is not necessary to use three transducers, one or more would be sufficient if it was of adequate reliability and integrity.

Although inputs from four wells are shown, the invention may be applicable to systems with any number of wells.

It may be advantageous in some situations to incorporate a further valve in the bypass line between the vent connection and the pressure transducers. This arrangement would be useful if it is necessary to bleed the pressure in the pipeline 4 side of the HIPPS valves 1, 2. This may be necessary in the case of gas wells for example.

The invention claimed is:

1. A protection apparatus for detecting and reducing overpressure in a fluid pipeline having a fluid input end and a fluid output end, the fluid input end being connected in use to a fluid source, comprising:
    first and second pipeline valves connected in series along the pipeline with the first pipeline valve being connected at a location closer to the input end than the connection location of the second pipeline valve, the first and second pipeline valves being independently switchable between open positions in which fluid flow through the pipeline is permitted and closed positions in which fluid flow through the pipeline is blocked;
    a pressure transducer for determining the fluid pressure in the pipeline at a point intermediate the first and second pipeline valves;
    a bypass line having a first end fluidly connected to the pipeline between the input end and the first pipeline valve and a second end fluidly connected to the pipeline between the first and second pipeline valves;
    a bypass valve connected along the bypass line, said bypass valve being switchable between an open position in which fluid flow through the bypass line is permitted and a closed position in which fluid flow through the bypass line is blocked;
    a vent line fluidly connected to the bypass line between the bypass valve and the second end of the bypass line, the vent line leading to a venting means
    a vent valve connected along the vent line, said vent valve being switchable between an open position in which fluid flow through the vent line is permitted and a closed position in which fluid flow through the vent line is blocked; wherein after an overpressure event, the opening of the bypass valve and vent valve reduces the overpressure between the input end and the first pipeline valve, and
    a subsea control module in communication with and configured to control the bypass valve, wherein after an over pressure event, the subsea control module is configured to open the bypass valve for a predetermined time, and further configured to subsequently reset the system.

2. Apparatus according to claim 1, wherein the bypass line has a bore diameter and such bypass line bore diameter is smaller than a bore diameter of the pipeline.

3. Apparatus according to claim 1, comprising a bypass branch connected between the bypass line and the output end, the bypass branch including a bypass branch valve.

4. Apparatus according to claim 3, wherein the bypass branch has a bore diameter and such bypass branch bore diameter is smaller than a bore diameter of the pipeline.

5. Apparatus according to claim 1, wherein the bypass line includes a second bypass valve, connected between the vent line and the pressure transducer.

6. Apparatus according to claim 1, wherein the fluid source comprises a hydrocarbon well.

7. Apparatus according to claim 6, comprising a well valve connected between the input end and the well.

8. Apparatus according to claim 7, wherein the fluid source comprises a plurality of hydrocarbon wells, and further comprising well valves connected between each well and the input end.

9. A hydrocarbon well comprising the apparatus in accordance with claim 1.

10. The apparatus of claim 3, wherein the subsea control module is in communication with and configured to control the first and second pipeline valves and bypass branch valve and is further configured to close the bypass branch valve while subsequently opening the second pipeline valve such that the pressure transducer senses a pressure in the fluid pipeline.

* * * * *